Patented Sept. 9, 1930

1,775,569

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

AQUEOUS EMULSION OF RUBBER, BALATA, OR GUTTA-PERCHA AND PROCESS OF PRODUCING THE SAME

No Drawing. Application filed December 2, 1922. Serial No. 604,616.

There are certain coagulated bodies, such as rubber, gutta-percha and balata, which have hitherto resisted attempts to disperse them in a state of fine subdivision in water. These substances originally occur in nature in latices, in which the colloidal particles are dispersed in a serum-like aqueous body containing other organic substances. By various processes, these colloidal particles are coagulated, producing crude rubber, balata or gutta-percha as the case may be. After these bodies have once been coagulated, it has been regarded as impossible to decoagulate them, but I have discovered that it is possible by a simple process to decoagulate these previously coagulated bodies and re-disperse them in a state of the finest subdivision in an aqueous medium without affecting their initial characteristics or qualities. Thus, by this process, one can, without material, if any, "depolymerization", disperse in water, crude rubber so that the particles or globules thereof are of substantially the same shape and the same order of magnitude as the original rubber particles in the latex; in which case, the dispersed particles or globules may be recoagulated in the form of crude rubber, vulcanized and otherwise treated in precisely the same way and with the same results that the original coagulated or crude rubber could be treated. In the case of crude or previously-coagulated rubber, the aqueous dispersion is not rubber latex for it lacks some of the other organic bodies which are found in the original latex.

Stated briefly, the process herein selected for purposes of illustration consists first in dissolving the coagulated body (crude rubber for example as obtained from *Hevea Braziliensis*) in a solvent of the aromatic or carbocyclic series such as benzol, toluol, xylol, or other kindred solvent, together with a saponifiable agent, such for example as a liquid fatty acid or the glycerides of the fatty acids. Into the solution is now gradually mixed water containing a saponifying agent, such as ammonia or a suitable amine or substituted ammonia, with the result that a dispersing agent or ammonium soap is formed in situ in the solution. The addition of water is continued until a change in phase occurs, the water ultimately constituting the continuous phase and the rubber and its solvent the disperse phase of the dispersion. This is all accomplished without the application of heat, but with continued agitation, first to ensure the dispersion of the saponifying agent throughout the rubber solution and then the dispersion of the ammoniated water throughout the solution, and, when the change in phase occurs, the dispersion of the rubber solution throughout the continuous aqueous medium. Now, by evaporation, the volatile solvent may be removed and recovered for reuse. By following this procedure, coagulated gutta-percha, balata and other kindred coagulated bodies, found originally in the state of dispersion in a latex may be separated into their globules and re-dispersed in an aqueous dispersion. In stating that the saponifiable substance is dissolved in the solution and that a saponifying agent is added to the water, I use the term "saponify" not as necessarily meaning that hydrolysis takes place, but in the broader sense that the saponifiable substance is converted into the colloid soap. Thus, while one may employ a suitable animal or vegetable oil or a sulphonated oil as the saponifiable agent, yet as previously stated one may with excellent results employ oleic acid as the saponifiable body. The character of the soap, which is utilized as the dispersing or stabilizing agent, must be such that the soap will not have the effect of causing the agglomeration or coagulation of the dispersed rubber globules, since certain metallic soaps have the effect of coagulating or throwing down some of the dispersed bodies. So far as my work has progressed, ammonium soap appears to be the only soap which should be used as the dispersing agent in forming an aqueous dispersion of rubber, balata or gutta-percha, when it is desired to form the soap in situ in the rubber solution, since the saponification may be accomplished at a relatively low temperature at which coagulation of the disperse phase of the dispersion is avoided, for it is a characteristic of such dispersible bodies that they are coagulated by the application of heat. While it is possible first to form the soap and add it to the water which is stirred into the rubber solution, nevertheless one does not thereby secure the complete separation and dispersion of the rubber globules which is accomplished by forming the soap in situ in the rubber solution.

The following will serve as an example for the production of an aqueous crude rubber dispersion:—In 750 grammes of benzene (or commercial benzol), dissolve 250 grammes of crude or previously-coagulated rubber (balata or gutta-percha) and 20 grammes of oleic acid with proper agitation, at normal (i. e. seasonable or room) temperatures. Thoroughly mix 20 grammes of 26° aqua ammonia with 750 grammes of water. Then slowly and gradually add and thoroughly mix the water with and into the rubber solution. The dispersed or diffused particles of oleic acid in the rubber solution are saponified in situ by the ammonia, forming an ammonium soap which apparently acts as a dispersing agent and stabilizes the final dispersion. As the ammoniated water is gradually added to and stirred into the rubber benzol solution, the water at first forms the disperse phase of the dispersion, but, as the total volume of added water increases, a change of phase finally occurs and the water then forms the continuous phase and the rubber solution the disperse phase of the dispersion. The final dispersion is a white milky liquid which may be diluted to any reasonable or operative extent with water. It may be used as thus produced, but preferably the solvent is removed by evaporation. For the best results, this is preferably accomplished in a vacuum still at a low temperature (say not over 50° C.) for the recovery of the solvent. The dispersed rubber globules may easily be coagulated by the addition of acetic acid or other coagulating agent, or by heating or vigorously agitating the dispersion, or by dropping a single drop of the dispersion on to the surface of 10,000 times its volume of water, and the rubber thus coagulated has all of the characteristics of the original crude or coagulated rubber prior to its dispersion, and after proper washing and drying is vulcanizable with the same sulphur factor and heat coefficient as the original crude rubber.

I have further discovered that it is possible to disperse sulphur in the rubber dispersion for the subsequent vulcanization of the rubber when coagulated from the dispersion. It is also possible to disperse (simultaneously with the coagulated rubber) resins or other substances, soluble in the common solvent used, which it may be desired to compound with the rubber or to mix with the rubber in those articles or products produced with the aid of the dispersed rubber. As illustrative of this the following example will serve:—250 grammes of rubber, 25 grammes of oleic acid, 7.5 grammes of sulphur and 7.5 grammes of resin are with the aid of agitation thoroughly dissolved in benzol until a physically homogeneous solution is produced. Then 750 grammes of water, into which has been thoroughly stirred 20 grammes of 26° aqua ammonia, is gradually and slowly stirred into the rubber-resin-sulphur solution. The same phenomenon previously described occurs. That is to say, the water first constitutes the disperse phase of the dispersion, but, with the gradual addition of the ammoniated water, a change in phase finally occurs so that the water constitutes the continuous phase of the dispersion in which the sulphur, the resin, the rubber and the solvent are dispersed in a state of most minute sub-division. The solvent is now removed and recovered at a temperature sufficiently low to prevent the coagulation of the rubber globules or particles.

In practicing the procedure outlined in the foregoing examples, care should be exercised to add the ammoniated water gradually to the solution of the dispersible bodies. In each case with the initial gradual addition of the water, it will be observed that there is a gradual thickening of the mass which continues until a sufficient quantity of water is added, whereupon the change in phase ensues. This process of dispersion is performed or practiced with the several components or ingredients unheated, or at ordinary room or seasonable temperatures, and substantially no losses of the volatile solvent occur; so that, during the subsequent evaporation or distillation of the solvent, it may be practically all recovered for re-use.

In the examples hereinbefore given, it will be noted that a small proportion of soap of the dispersible body or bodies is employed, and also that the ammonia is somewhat in excess of that required for the saponification of the oleic acid. Approximately 5% to 10%, more or less, of oleic acid (by weight) to the dispersible body is sufficient to furnish, with the requisite amount of ammonia, enough soap or colloid for the most minute subdivision and dispersion of said body throughout the continuous aqueous phase. In the case of rubber, the dispersed particles are globular and in size approximate (and in many cases are no larger than) the rubber globules found in the original rubber latex. Since ammonium oleate is unstable and easily breaks down, it is quite likely that the excess ammonia serves to prevent such breaking down. While I am able to produce dispersions by employing an amount of ammonia theoretically sufficient to saponify the oleic acid, yet I regard it as desirable to have the ammonia slightly in excess, as apparently in such case I secure a finer dispersion of the dispersed body. The particles are of such order of minuteness as to permit of the development of the Brownian movement.

Such aqueous dispersions as herein described may be employed in the manufacture of all kinds of felted fabrics, such as paper, card-board, box-board, sheathing or roofing paper or felt, or leatherboard; and cotton or wool felt such as employed in the manufacture of hat bodies, shoe stiffeners, slippers, etc.; as well as for the treatment of fibers either alone or in the form of yarn, thread, or knitted, woven or braided fabrics.

Thus, in the manufacture of a tough water-repellent paper, which may be flexed without breaking and which is torn with difficulty,—crude rubber, or crude rubber and resin or other water-repelling body, are dispersed by proceeding as hereinbefore described; and, after the fibrous pulp or stock has been beaten in the usual beating engine to the desired extent, the beater roll is preferably lifted from the bed plate and sufficient aqueous dispersion (say 2.5% of the dispersed bodies to 100% by weight of dry fiber) is added to the beater content and the operation of the roll is continued until the dispersion is thoroughly incorporated in the fibrous mass. In the case of rubber, sometimes the agitation is sufficient to effect a coagulation of the rubber particles and their adherence to the fibers, but ordinarily it is desirable to add a precipitating or coagulating agent such as acetic acid, alum or other agent employed for the coagulation of rubber from the latex. The pulp is then sheeted on any suitable paper machine, either in a continuous web, or in a tube on the make-up roll of a wet machine. In the event that a web is formed by a multi-cylinder machine, the top or bottom (or both) laminations of the sheet may be formed of any usual paper stock and the intermediate layer or layers may be formed of the rubberized stock, or these conditions may be reversed and only the outer layer or layers of the sheet be formed of the rubberized stock. Where that body, which is employed with the rubber such as a resin or gum, is capable of coalescence under heat, the sheet may be heated and pressed if desired after its formation sufficiently to effect such coalescence. When sulphur is dispersed with the rubber in the original dispersion, and is precipitated with the rubber particles in the sheeted pulp, the final sheet may be subjected to a vulcanizing temperature and pressure to effect the vulcanization of the rubber in situ in the sheet.

Coated or treated webs or fabrics may be produced by passing previously formed sheets through an aqueous rubber dispersion, with or without other dispersed bodies, in which case the water of the dispersion is removed by evaporation.

In the manufacture of leather-board or soles for footwear, one may incorporate in the pulped scrap leather a rubber dispersion together with sulphur and other suitable compounding materials and form the pulped mass into sheets either by use of a paper machine or by rolling it out. In this case, where the product is to be subjected to vulcanization, sulphur is dissolved in the benzol during the formation of the dispersion sufficient in quantity to effect the vulcanization of the rubber; so that, when the sheet is subsequently heated and pressed, the rubber is vulcanized in situ in the sheet. Of course, in lieu of pulped leather, one may utilize a pulp formed of various animal or vegetable fibers, or both, such as cattle hair, wood pulp, cotton rags, etc. Of course it will be understood that, in lieu of incorporating sulphur in the dispersion for the vulcanization of the rubber, a product formed by or treated with my rubber dispersion may be vulcanized by any other process, such as one in which sulphur chloride is utilized or in which hydrogen sulphide and sulphur dioxide are employed.

Reverting once more to the aqueous rubber dispersion herein described, I wish to emphasize that, by the process which I have explained, no material (if any) "depolymerization" of the rubber occurs, such as would be effected if the crude rubber were subjected to elevated temperatures, or to the action of other depolymerizing agents. This is of primary importance for, as previously stated, after the dispersed rubber is recoagulated and washed to remove the coagulating agent, the ammonia and the soap, the coagulated rubber apparently differs in no respect from the original crude rubber prior to its dispersion and, when treated in the same way, produces the same results as the original crude rubber.

This is a continuation, so far as generic subject matter is concerned, of my application Serial No. 583,903, filed August 23, 1922.

What I claim is:

1. An aqueous dispersion of a nonvulcanized body of the character of rubber, in which the globules of the previously-coagulated body are separated and dispersed together with a colloidal dispersing agent, without depolymerization, throughout the body of water and are capable of recoagulation and vulcanization with the same sulphur factor and heat coefficient as the original rubber, and in which the ratio of rubber to water is at least 1 to 3.

2. An aqueous dispersion of a novulcanized previously-coagulated rubber, in which the previously-coagulated rubber together with a colloidal dispersing agent is dispersed without material, if any, depolymerization in a state of fine subdivision throughout a body of water, and is capable of recoagulation and vulcanization with the same sulphur factor and heat coefficient as the original rubber, and in which the ratio of rubber to water is at least 1 to 3.

3. An aqueous dispersion of a nonvulcanized crude rubber, in which the globules of crude rubber are, together with a colloidal dispersing agent, dispersed without depolymerization in a state of fine subdivision throughout a body of water, and is capable of recoagulation and vulcanization with the same sulphur factor and heat coefficient as the original rubber, and in which the ratio of rubber to water is at least 1 to 3.

4. An aqueous dispersion of a nonvulcanized coagulated body of the character of rubber, balata or gutta-percha, in which the said body, together with an ammonium soap, is dispersed in a state of fine subdivision.

5. An aqueous dispersion of nonvulcanized crude rubber, characterized by the dispersion in water, with the aid of a colloid, of the rubber in a state of subdivision approximating the rubber globules of latex and in which the ratio of rubber to water is at least 1 to 3, and capable of recoagulation and the same uses when coagulated as the original crude rubber before its dispersion.

6. A process of dispersing a coagulated body such as crude rubber, balata or gutta-percha in water, which comprises dissolving such body in a volatile solvent at ordinary temperatures, and dispersing the solution in water by gradually adding and incorporating water into the solution until after a change in phase occurs and the body is dispersed in the water.

7. A process of dispersing a coagulated body such as crude rubber, balata or gutta-percha in water, which comprises dissolving such body in a volatile solvent at ordinary temperatures, dispersing the solution in water by gradually adding and stirring unheated water into the solution until after a change in phase occurs and the body is dispersed in the water, and then removing the solvent from the dispersion.

8. A process of dispersing a coagulated body such as crude rubber, balata or gutta-percha in water, which comprises dissolving such body in a volatile solvent at ordinary temperatures together with a soluble saponifiable agent, and gradually adding to and stirring into said solution water containing ammonia sufficient to saponify said agent until a change of phase occurs and the body is dispersed in the water.

9. A process of dispersing a coagulated body such as crude rubber, balata or gutta-percha in water, which comprises dissolving such body in a volatile solvent at ordinary temperatures together with a soluble saponifiable agent, gradually adding to and stirring into said solution water containing ammonia sufficient to saponify said agent until a change of phase occurs and the body is dispersed in the water, and then removing the solvent at a low temperature, at which recoagulation of said dispersed body does not occur.

10. A process of dispersing a coagulated body such as crude rubber, balata or gutta-percha in water, which comprises dissolving such body in a volatile solvent at ordinary temperatures together with a small percentage of oleic acid until the oleic acid is diffused throughout the solution, and then gradually adding and stirring into the solution water containing ammonia sufficient to saponify the oleic acid, until after a change of phase occurs and the previously-coagulated body is dispersed in the water.

11. A process of dispersing a coagulated body such as crude rubber, balata or gutta-percha in water, which comprises dissolving such body in a volatile solvent at ordinary temperatures together with a small percentage of oleic acid until the oleic acid is diffused throughout the solution, then gradually adding and stirring into the solution water containing ammonia sufficient to saponify the oleic acid, until after a change of phase occurs and the previously-coagulated body is dispersed in the water, and finally removing and recovering the solvent at a temperature which does not effect a recoagulation of the dispersed body.

12. A process of dispersing crude rubber and sulphur in water, which consists in dissolving said rubber and sulphur in benzol or its equivalent together with oleic acid, and then gradually adding and stirring into the solution water containing ammonia sufficient to saponify the diffused oleic acid in situ, until a change of phase occurs and the rubber and sulphur are dispersed in the water.

13. A process of dispersing crude rubber and sulphur in water, which consists in dissolving said rubber and sulphur in benzol or its equivalent together with oleic acid, then gradually adding and stirring into the solution water containing ammonia sufficient to saponify the diffused oleic acid in situ, until a change of phase occurs and the rubber and sulphur are dispersed in the water, and finally removing the solvent at a temperature which does not cause a recoagulation of the dispersed rubber.

14. The herein described process which comprises dissolving rubber, sulphur, a resin and oleic acid in a volatile solvent, then gradually adding and stirring water containing ammonia sufficient to saponify the oleic in situ into the solution until a change of phase occurs and the first-mentioned bodies are dispersed in the water, and finally removing the solvent.

15. A process of dispersing rubber, which comprises incorporating water and a dispersing agent as the disperse phase into a mass of rubber as the continuous phase, and then manipulating the mass with the gradual addition of water until a change of phase occurs, and the water becomes the continuous phase and rubber the disperse phase.

16. A process of dispersing rubber, which comprises forming a mass including rubber and a vulcanizing agent, incorporating water and a colloid into said mass as the disperse phase, and then manipulating said mass with the gradual addition of water until a change of phase occurs, and the water becomes the continuous phase and rubber and the vulcanizing agent become the disperse phase.

17. A dispersion of previously-coagulated rubber in water containing a colloidal dispersing agent, the rubber being present in the form of minute, undepolymerized particles and amounting by weight to at least one-third of the water content of the dispersion.

18. A dispersion of previously-coagulated rubber in water containing soap, the rubber being present in the form of minute, undepolymerized particles and amounting by weight to at least one-third of the water content of the dispersion.

19. A dispersion of previously-coagulated rubber in water containing an ammonium soap, the rubber being present in the form of minute particles stabilized by the soap.

20. A dispersion of previously-coagulated rubber and sulphur in water containing a colloidal dispersing agent, the rubber and sulphur being present in the form of minute particles protected by said dispersing agent.

21. A dispersion of previously-coagulated rubber and sulphur in water containing a colloidal dispersing agent, the rubber and sulphur being present in the form of minute particles protected by said dispersing agent and the rubber amounting to at least one-third of the water content of the dispersion.

22. A process of dispersing rubber in water, which comprises dissolving the rubber in a volatile solvent, incorporating a dispersing agent into the mass, and adding water until a dispersion is obtained in which the water constitutes the continuous phase and the rubber and solvent the disperse phase, and removing the solvent without coagulating the rubber.

23. A process of dispersing rubber in water, which comprises dissolving the rubber in a volatile solvent, incorporating a dispersing agent into the mass, and adding water until a dispersion is obtained in which the water constitutes the continuous phase and the rubber and solvent the disperse phase, and vacuum-distilling the solvent from the dispersion without coagulating the rubber.

24. A process of dispersing rubber in water, which comprises dissolving the rubber in a volatile solvent, incorporating a dispersing agent into the mass, and adding water until a dispersion is obtained in which the water constitutes the continuous phase and the rubber and solvent the disperse phase, and vacuum-distilling the solvent from the dispersion at a temperature below 50° C.

25. A process of dispersing rubber in water, which comprises dissolving the rubber and a saponifiable material in a solvent, and adding to said solution an aqueous solution of a saponifying agent to saponify said material in situ and effect a dispersion of the rubber in the aqueous medium.

26. A process of dispersing rubber in water, which comprises dissolving the rubber and a saponifiable material in a volatile solvent, adding to said solution an aqueous solution of a saponifying agent to saponify said material in situ and effect a dispersion of the rubber in the aqueous medium, and then removing the solvent from the dispersion without coagulating the rubber.

27. A process of dispersing rubber in water, which comprises dissolving the rubber together with oleic acid in a volatile solvent, adding to said solution an aqueous solution of a saponifying agent to saponify the oleic acid in situ and effect a dispersion of the rubber in the aqueous medium, and then removing the solvent from the dispersion without coagulating the rubber.

In testimony whereof I have affixed my signature.

WILLIAM BEACH PRATT.